(12) United States Patent
Liu et al.

(10) Patent No.: US 7,979,805 B2
(45) Date of Patent: Jul. 12, 2011

(54) BUTTON DISCOVERABILITY

(75) Inventors: Sally Liu, Seattle, WA (US); Jonathan Friedman, Seattle, WA (US); Leroy B Keely, Portola Valley, CA (US); Hugh Edward McLoone, Jr., Bellevue, WA (US); David Ben Perry, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/751,056

(22) Filed: May 21, 2007

(65) Prior Publication Data

US 2008/0295015 A1    Nov. 27, 2008

(51) Int. Cl.
*G06F 3/00* (2006.01)
*G06F 3/01* (2006.01)
*G06F 3/14* (2006.01)

(52) U.S. Cl. ........ 715/772; 715/702; 715/705; 715/773; 715/864; 715/866

(58) Field of Classification Search .......... 715/700–702, 715/716, 764, 767, 772, 773, 802, 864, 866, 715/705, 708
See application file for complete search history.

(56) References Cited

U.S. PATENT DOCUMENTS

| | | | | |
|---|---|---|---|---|
| 5,317,687 A * | 5/1994 | Torres | ........................... | 715/823 |
| 5,973,688 A * | 10/1999 | May | ........................... | 715/709 |
| 6,727,830 B2 | 4/2004 | Lui et al. | | |
| 6,833,827 B2 | 12/2004 | Lui et al. | | |
| 6,903,840 B1 * | 6/2005 | Maymin et al. | ........................... | 358/1.15 |
| RE39,090 E * | 5/2006 | Beauregard et al. | ........................... | 1/1 |
| 7,134,094 B2 * | 11/2006 | Stabb et al. | ........................... | 715/827 |
| 7,139,850 B2 * | 11/2006 | Amemiya et al. | ........................... | 710/48 |
| 7,417,625 B2 * | 8/2008 | Morris | ........................... | 345/169 |
| 2002/0173299 A1 * | 11/2002 | Buchholz et al. | ........................... | 455/418 |
| 2004/0001105 A1 | 1/2004 | Chew et al. | | |
| 2005/0091601 A1 | 4/2005 | Raymond et al. | | |
| 2005/0283729 A1 * | 12/2005 | Morris et al. | ........................... | 715/720 |
| 2006/0041858 A1 | 2/2006 | Yan et al. | | |
| 2006/0048078 A1 * | 3/2006 | Scott | ........................... | 715/864 |
| 2006/0062382 A1 * | 3/2006 | Ronkainen | ........................... | 379/433.06 |
| 2006/0209014 A1 | 9/2006 | Duncan et al. | | |
| 2006/0209016 A1 | 9/2006 | Fox et al. | | |

(Continued)

OTHER PUBLICATIONS

Vertegaal, et al., "Tangible Bits and Malleable Atoms in the Design of a Computer Music Instrument", 2001, pp. 311-312.

Smith, et al., "Using the Resources Model in Virtual Environment Design", York, England, 1999, pp. 16.

(Continued)

*Primary Examiner* — Tadeese Hailu
*Assistant Examiner* — Yongjia Pan
(74) *Attorney, Agent, or Firm* — Capitol City TechLaw; Richard C. Irving

(57) ABSTRACT

A processing device may include a display screen and one or more buttons located near the display screen. Pressing one of the one or more buttons may cause the processing device to perform a first function and pressing and holding the one of the one or more buttons may cause the processing device to perform a second function. When the one of the one or more buttons is pressed, the processing device may provide a first feedback describing the first function. When the one of the one or more buttons is pressed and held for at least a predetermined amount of time, the processing device may provide a second feedback describing the second function. In some implementations, a time indicator may be displayed indicating an amount of passing time until the one of the one or more buttons is pressed and held for the predetermined amount of time.

19 Claims, 9 Drawing Sheets

U.S. PATENT DOCUMENTS

2006/0213754 A1* 9/2006 Jarrett et al. ............... 200/43.01
2006/0265718 A1 11/2006 Tsang et al.
2006/0277195 A1* 12/2006 Schulz et al. ................... 707/10
2008/0126975 A1* 5/2008 Vassigh et al. ................ 715/772

OTHER PUBLICATIONS

"Supporting Hardware Buttons ", Microsoft Corporation, 2007, pp. 1-2.

* cited by examiner

BUTTON DISCOVERABILITY

BACKGROUND

Buttons may provide users of processing devices, such as, for example, personal computers and other processing devices, quick access to commonly-used functions. If a user does not use a button regularly, or if there are multiple buttons, the user may have difficulty remembering which button is associated with which function. If a button has multiple functions, the user may have more difficulty remembering which functions are associated with a particular button.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a processing device may include a display screen and one or more buttons. The one or more buttons may be located near the display screen. When one of the one or more buttons is pressed and released, the processing device may perform a respective first function associated with the pressed button. When the one of the one or more buttons is pressed and held, the processing device may perform a respective second function associated with the pressed and held button. In various embodiments, when a button is pressed, the processing device may provide a first feedback describing a first function associated with pressing of the button. When a button is pressed and held for at least a predetermined amount of time, the processing device may provide a second feedback describing a second function associated with pressing and holding of the button.

In some embodiments, the processing device may provide a button map, which may include feedback with respect to multiple hardware buttons and associated functions.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a processing device, which may include one or more buttons, is provided. Pressing the one or more buttons may cause the processing device to perform common functions. In one embodiment, pressing a particular button may result in the processing device performing a first function, and pressing and holding the particular button for at least a predetermined amount of time may result in the processing device performing a second function.

In various embodiments, when a user presses a button, the processing device may provide feedback, such as, for example, a visual feedback, to help the user understand and remember a function associated with pressing the hardware button. In one embodiment in which a button may be associated with a first function and a second function, the processing device may provide a first feedback describing the first function when the hardware button is pressed, or pressed and released, and the processing device may provide a second feedback describing the second function when the hardware button is pressed and held for at least a predetermined amount of time.

In some embodiments, the processing device may provide a button map, which may include feedback with respect to multiple hardware buttons and associated functions.

Exemplary Processing Device

Figure 1:
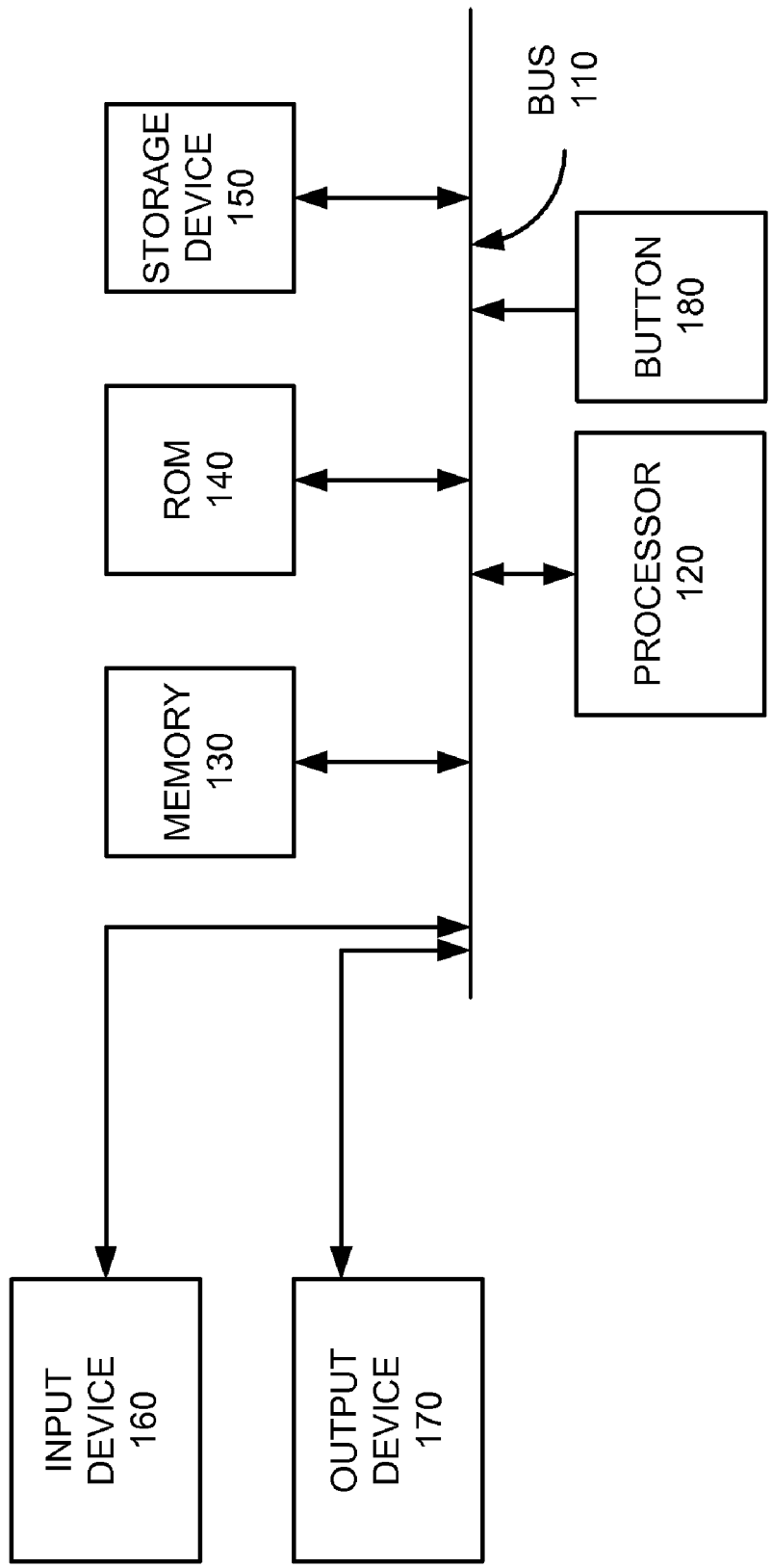
FIG. 1 is a functional block diagram of a processing device which may implement embodiments consistent with the subject matter of this disclosure.

FIG. 1 is a functional block diagram that illustrates an exemplary processing device 100, which may be used to implement embodiments consistent with the subject matter of this disclosure. Processing device 100 may include a bus 110, a processor 120, a memory 130, a read only memory (ROM) 140, a storage device 150, an input device 160, an output device 170, and button 180. Bus 110 may permit communication among components of processing device 100. Processing device 100 may be a desktop personal computer (PC), a notebook PC, a handheld processing device, a tablet PC, or other type of processing device.

Processor 120 may include at least one conventional processor or microprocessor that interprets and executes instructions. Memory 130 may be a random access memory (RAM), a Flash memory, or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media for storing data and/or instructions.

Input device 160 may include one or more conventional mechanisms that permit a user to input information to processing device 100, such as, for example, a keyboard, a mouse, a touch screen, or other input device. Output device 170 may include one or more conventional mechanisms that output information to the user, including one or more displays, or other output devices.

Button 180 may be a hardware button located near a display screen. Pressing of button 180 may cause a signal to be sent to processor 120 via bus 110 indicating that the button is pressed.

Processing device 100 may perform such functions in response to processor 120 executing sequences of instructions contained in a tangible machine-readable medium, such as, for example, memory 130, or other medium. Such instructions may be read into memory 130 from another machine-readable medium, such as storage device 150, or from a separate device via a communication interface (not shown).

Exemplary Displays

Figure 2A:
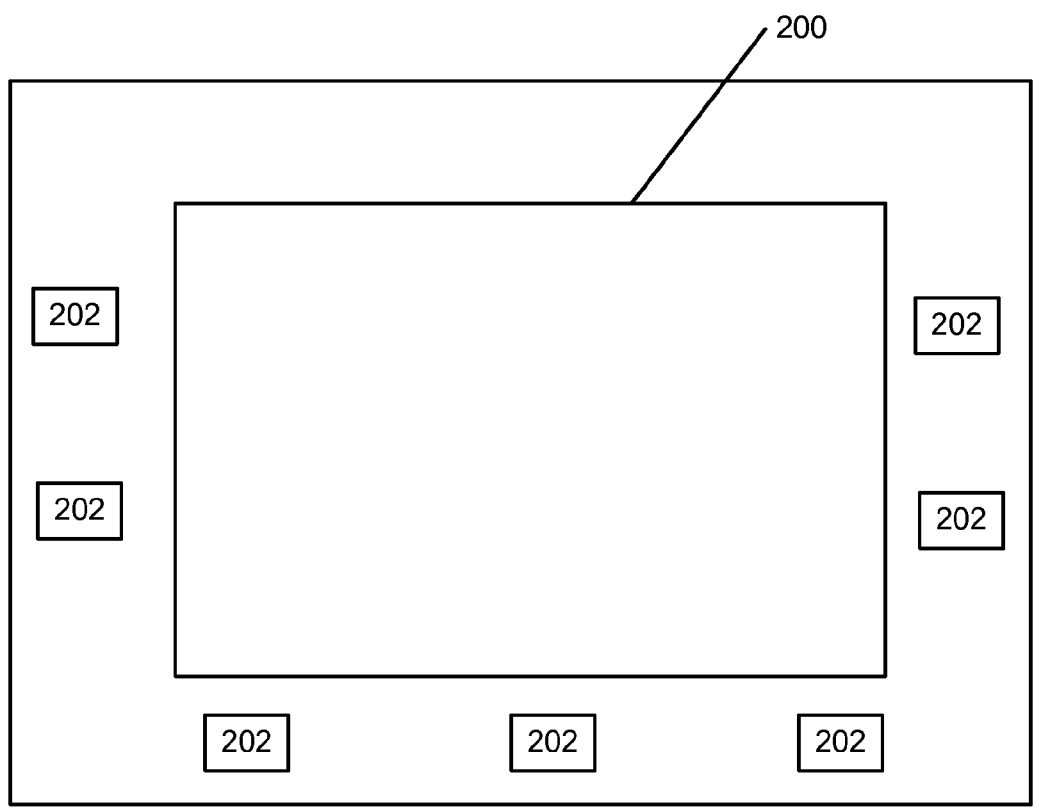
FIG. 2A illustrates a portion of an exemplary processing device including a display screen and multiple hardware buttons associated with functions the exemplary processing device may perform.

FIG. 2A illustrates a portion of an exemplary processing device consistent with the subject matter of this disclosure. The exemplary processing device may include a display screen 200 and one or more hardware buttons 202 located on surfaces in proximity to display screen 200.

Figure 2B:
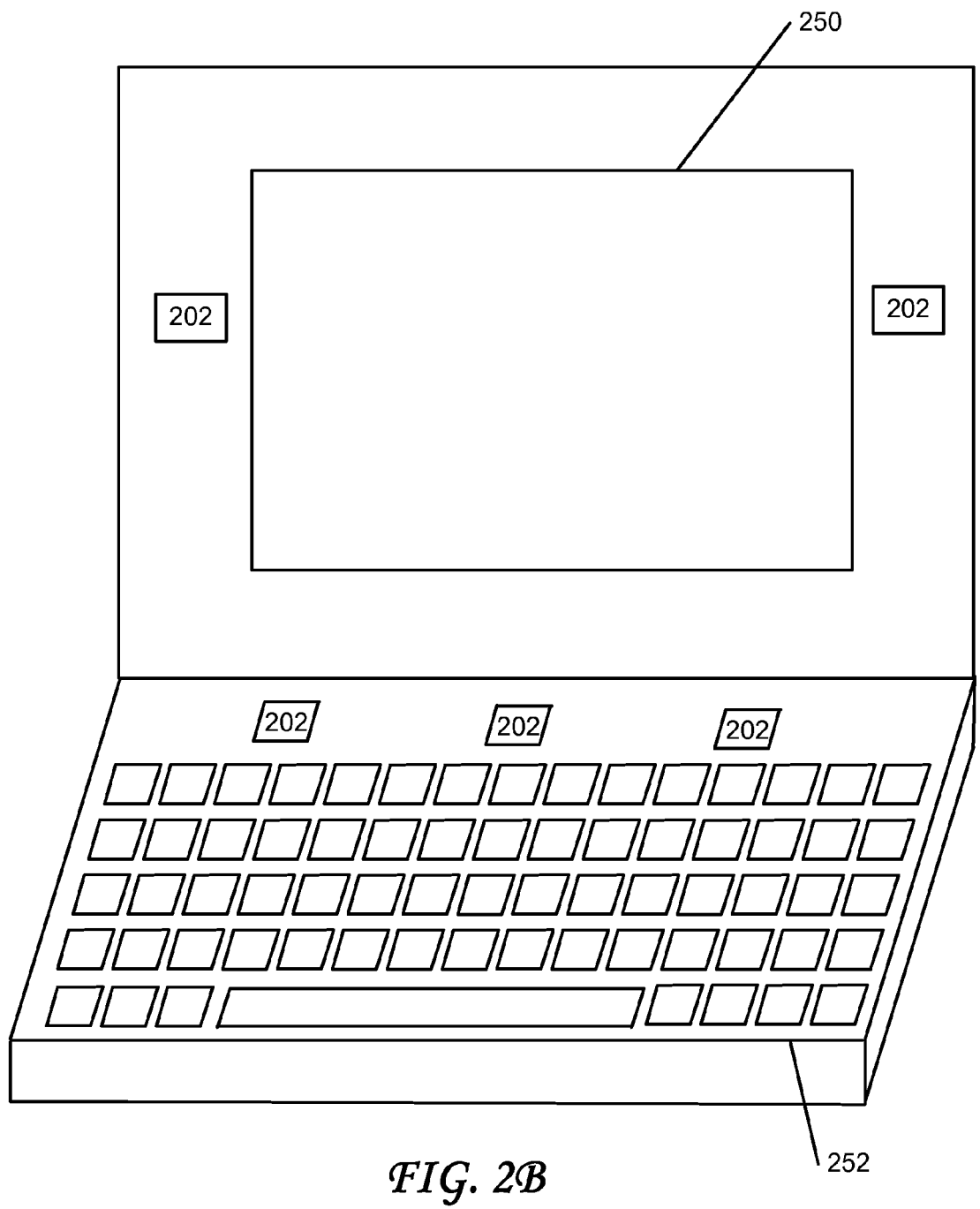
FIG. 2B illustrates a portion of a second exemplary processing device including a display screen, a keyboard, and multiple hardware buttons associated with functions the second exemplary processing device may perform.

FIG. 2B shows a second exemplary processing device consistent with the subject matter of this disclosure. The second exemplary processing device may include a display screen 250 and a keyboard 252. The keyboard may include one or more hardware buttons 202, each associated with at least one function that the second exemplary processing device may perform when a respective one of the one or more hardware buttons 202 is pressed. In some embodiments, hardware buttons 202 may be located close to display screen 250.

Figure 3A:
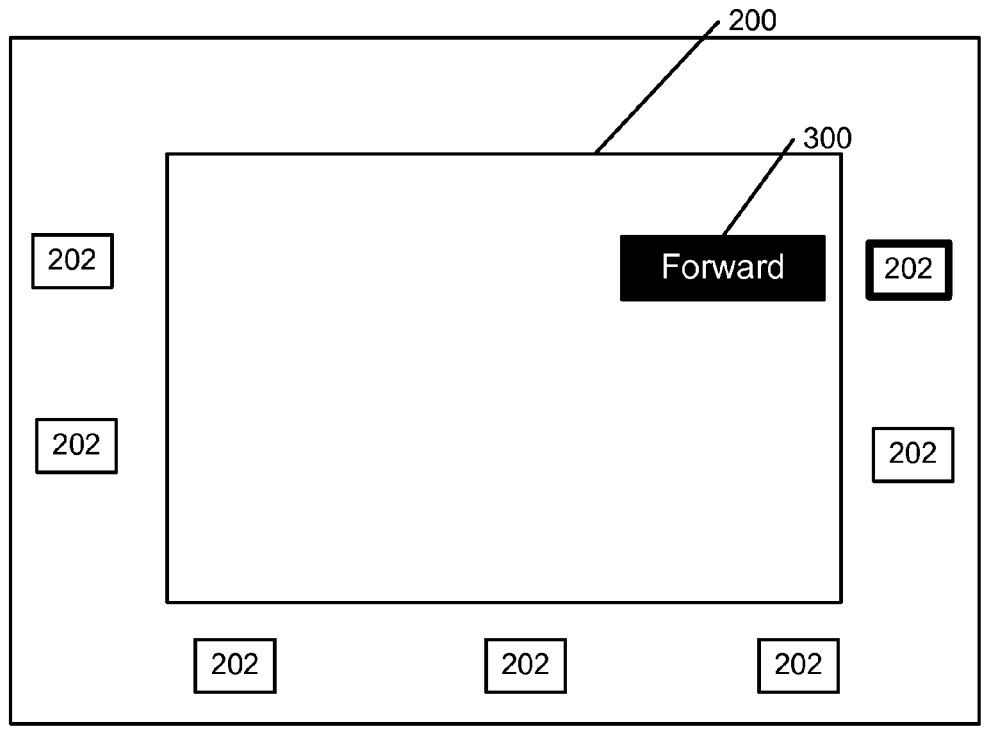
FIGS. 3A-6 show exemplary display screens illustrating visual feedback, which may be provided to describe functions associated with buttons of a processing device.

FIG. 3A illustrates the exemplary processing device of FIG. 2A having multiple hardware buttons 202 in close proximity to display screen 200. In one embodiment consistent with the subject matter of this disclosure, a user may press one of hardware buttons 202. In the exemplary display of FIG. 3A, one of hardware buttons 202, shown with a thick surrounding line, may be pressed, thereby causing the exemplary processing device to display a function associated with pressed hardware button 202. In this example, pressed hardware button 202 is associated with a forward function, which may be, for example, a common function implemented by web browsers. Therefore, the exemplary processing device may display visual feedback 300 describing the forward function. In this example, the visual feedback may include text, describing the forward function, displayed in a portion of display screen 200 near pressed hardware button 202. In other embodiments, the visual feedback may include an image or an icon.

Figure 3B:
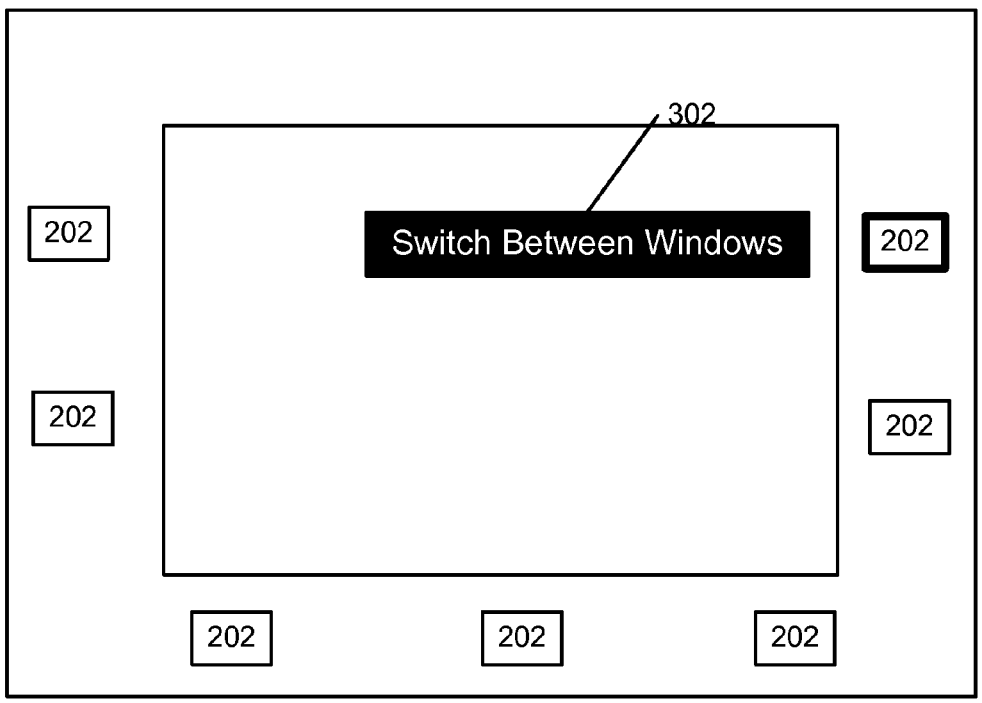

In this embodiment, if pressed hardware button 202 is held in a pressed position for at least a predetermined amount of time, then the exemplary processing device may display a second visual feedback describing a second function associated with pressed and held hardware button 202. In this example, the second function associated with pressed and held hardware button 202 may be a switch between windows function, as indicated by a second visual feedback 302 (FIG. 3B). In this exemplary embodiment, the first visual feedback and the second visual feedback may include text and may be provided in a position of display screen 200 near a location of pressed hardware button 202. Further, when pressed hardware button 202 is released, the processing device may perform the first function if pressed hardware button 202 was pressed for less than a predetermined amount of time. Otherwise, the processing device may perform the second function. In this embodiment, when one of hardware buttons 202 is pressed, the processing device may display the first visual feedback, and after pressed hardware button 202 is pressed and held for the predetermined amount of time, the first visual feedback may be cleared and the second visual feedback 302 may be provided on display screen 200. In some embodiments, a cancellation feature may be provided, such that a user may cancel button actions by performing a user action. The user action may include pressing of a cancellation button before releasing pressed hardware button 202, or by performing another user action.

Figure 4A:
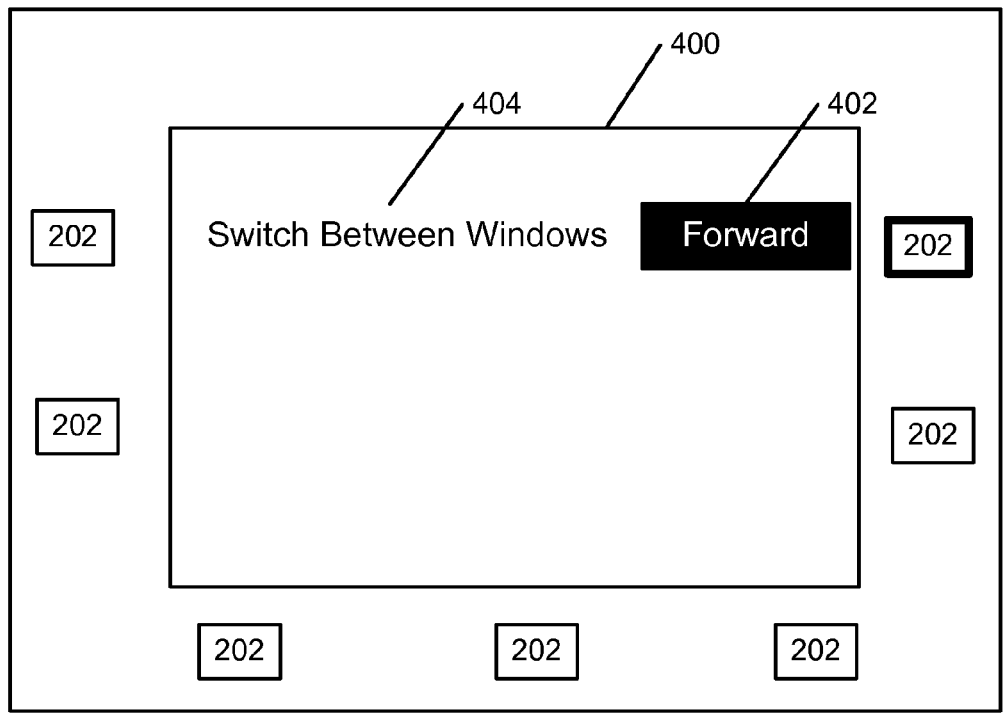
Figure 4B:
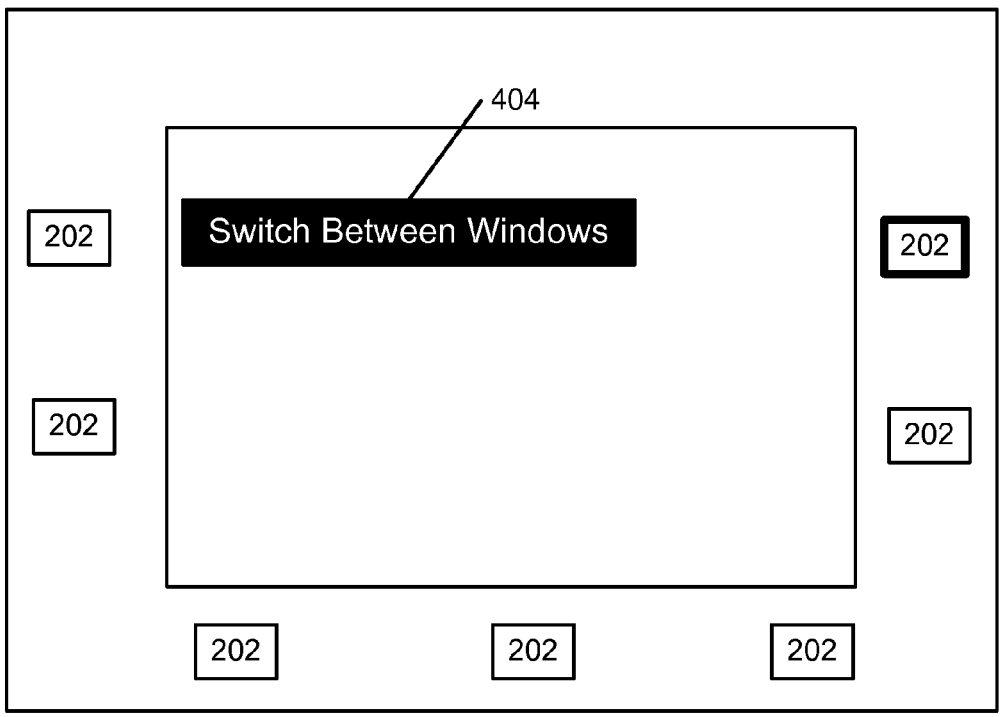

FIGS. 4A-4B illustrate a second exemplary embodiment consistent with the subject matter of this disclosure. FIGS. 4A-4B illustrate display screen 400 of an exemplary processing device with multiple hardware buttons 202 placed at different locations near display screen 400. A user may press one of hardware buttons 202, located right of display screen 400 and indicated by a heavy line. As a result of pressing one of hardware buttons 202, the processing device may display both a first visual feedback 402 and a second visual feedback 404 near pressed hardware button 202 (FIG. 4A). Both first visual feedback 402 and second visual feedback 404 may include text explaining a first function and a second function, respectively, associated with pressed hardware button 202. First visual feedback 402 may be highlighted and second visual feedback 404 may not be highlighted. After pressed hardware button 202 is pressed and held for a predetermined amount of time, the processing device may clear first visual feedback 402 from display screen 400 and may highlight second visual feedback 404 (FIG. 4B). When pressed hardware button 202 is released, the processing device may perform the first function if first visual feedback 402 is displayed and highlighted. Otherwise, if second visual feedback 404 is displayed and highlighted when pressed hardware button 202 is released, then the processing device may perform the second function.

Figure 5A:
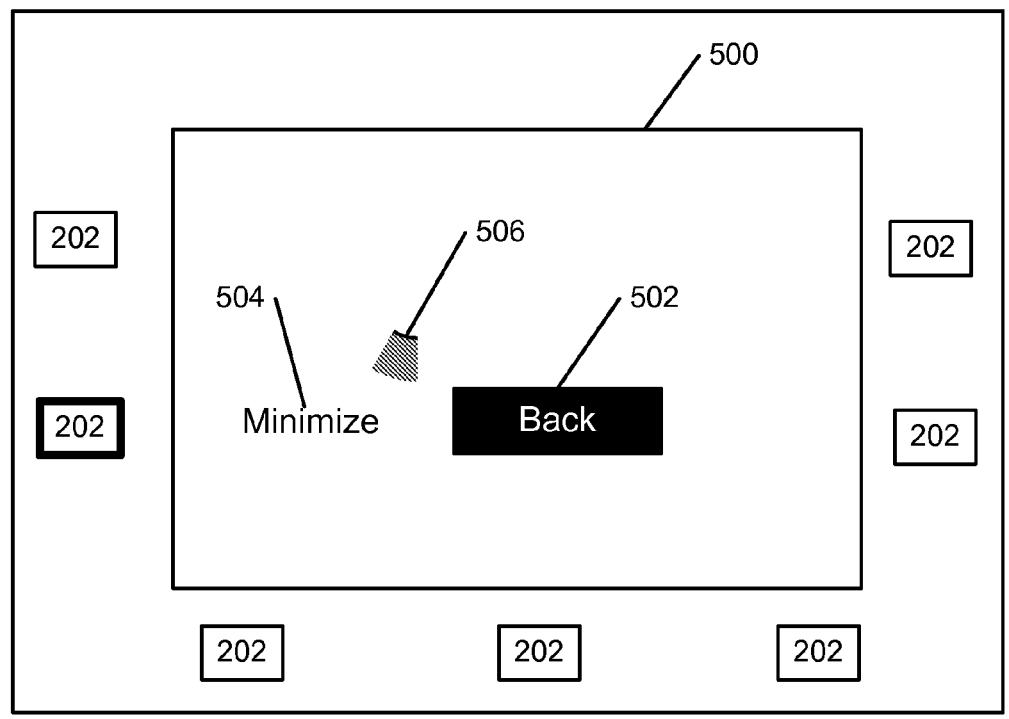
Figure 5B:
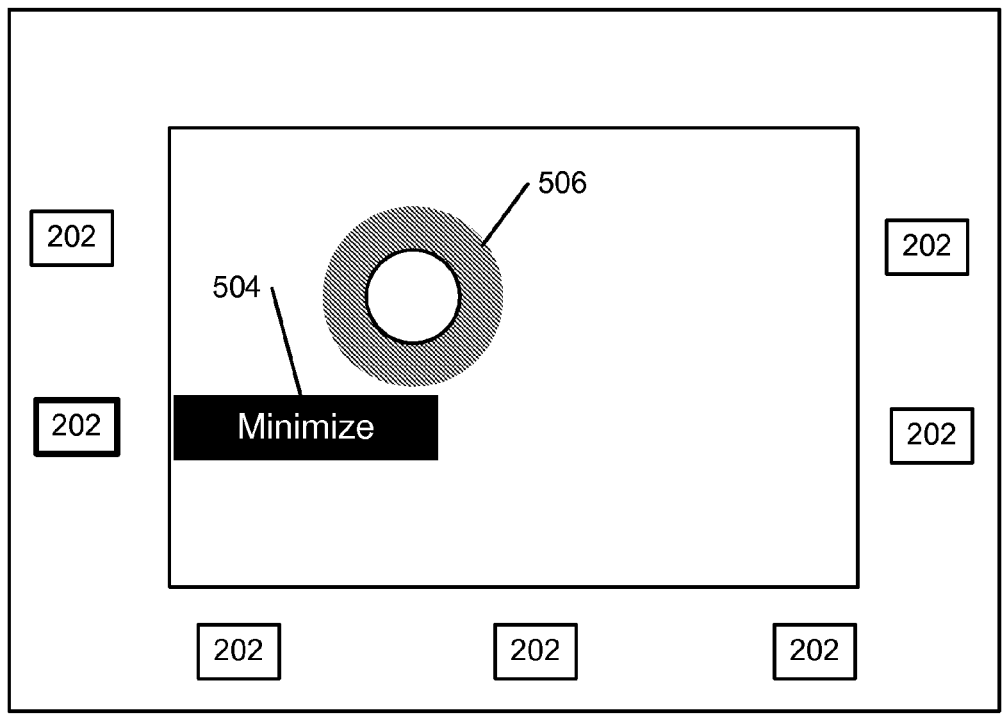

FIGS. 5A-5B illustrate a third embodiment consistent with the subject matter of this disclosure. In this embodiment, the processing device may provide an indication of passing time. FIGS. 5A-5B illustrate display screen 500 of an exemplary processing device with multiple hardware buttons 202 placed at different locations near display screen 500. A user may press one of hardware buttons 202, located left of display screen 500 and below another hardware button 202. In FIGS. 5A and 5B, pressed hardware button 202 is indicated by a heavy line. As a result of pressing pressed hardware button 202, the processing device may display both a first visual feedback 502 and a second visual feedback 504 near pressed hardware button 202 (FIG. 5A). First visual feedback 502 may be highlighted and second visual feedback 504 may not be highlighted. The processing device may also display a time indicator 506 near first visual feedback 502 and second visual feedback 504. As time passes, the processing device may display time indicator 506 as changing. In this embodiment, time indicator 506 may form a portion of a circle and may form a complete circle after pressed hardware button 502 is pressed and held for a predetermined amount of time (FIG. 5B). After pressed hardware button 202 is pressed and held for the predetermined amount of time, the processing device may clear first visual feedback 502 and may highlight second visual feedback 504 (FIG. 5B). When pressed hardware button 202 is released, the processing device may perform a first function (back), which is commonly implemented by web browsers, if first visual feedback 402 is displayed and highlighted. Otherwise, if second visual feedback 404 is displayed and highlighted when pressed hardware button 202 is released, then the processing device may perform the second function (minimize), which may cause a displayed window to be minimized.

In the embodiment illustrated by FIGS. 5A-5B, time indicator 506 is shown as forming a circle, with portions of the circle being added to time indicator 506, as time passes, until the predetermined amount of time has passed while hardware button 202 is pressed and held. In variations of this embodiment, time indicator 506 may be something other than a circle. For example, time indicator 506 may be a clock having a hand counting down to zero, an hourglass showing sand emptying to a bottom portion of the hourglass, or any other suitable indicator of passing time.

Figure 6:
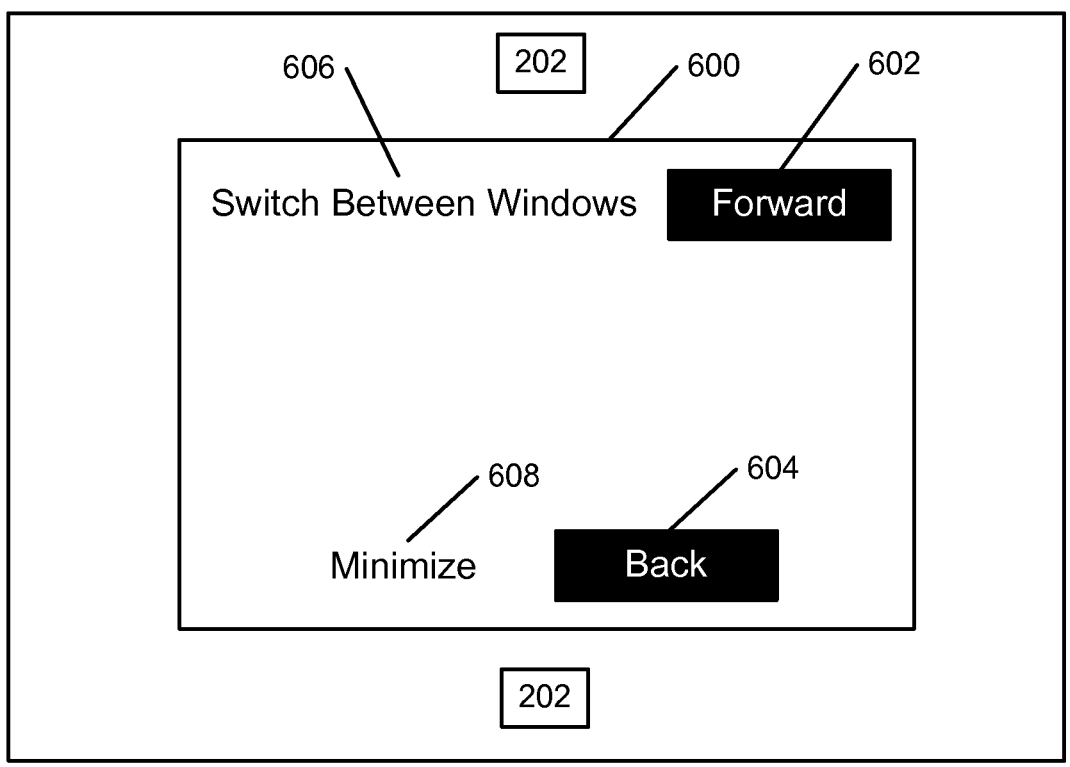

In some embodiments consistent with the subject matter of this disclosure, a processing device may include a button map feature. In such embodiments, the processing device may display the button map feature 1) when a button map command is entered via a command console, 2) when one of hardware buttons 202, reserved for the button map feature, is pressed, 3) when one of hardware buttons 202 is pressed and has no function in a current state of the processing device, 4) when initiated from a system tray icon, or 5) during other situations. FIG. 6 illustrates a portion of the processing device having display screen 600 and multiple hardware buttons 202. When the processing device performs the button map feature, the processing device may display first visual feedbacks 602, 604 and second visual feedbacks 606, 608, with respect to hardware buttons 202. In some implementations, first visual feedbacks 602, 604 may be highlighted while second visual feedbacks 606, 608 may be unhighlighted. In other implementations, when the processing device performs the button map feature, the processing device may not be limited to only displaying first visual feedbacks 602, 604 and second visual feedbacks 606, 608. Instead, the processing device may provide a more detailed and descriptive feedback.

In some variations of the embodiments illustrated by FIGS. 3A-6, visual feedback may be displayed in a different shade or color from other visual feedback when the visual feedback is provided with respect to one or more hardware buttons 202 having no function in a current state of the processing device. In one implementation, visual feedback with respect to one or more hardware buttons 202 having no function in the current state of the processing device, may be provided in gray, or another color or shade. In another implementation, such visual feedback may be provided with a line or an X slashing through the visual feedback, or may be provided by some other indication.

In other variations of the embodiments illustrated by FIGS. 3A-6, display screens 300, 400, 500, 600 may display a background scene while providing visual feedback. The visual feedback, in such embodiments, may be rendered clearly on all background scenes.

Exemplary Processing

Figure 7:
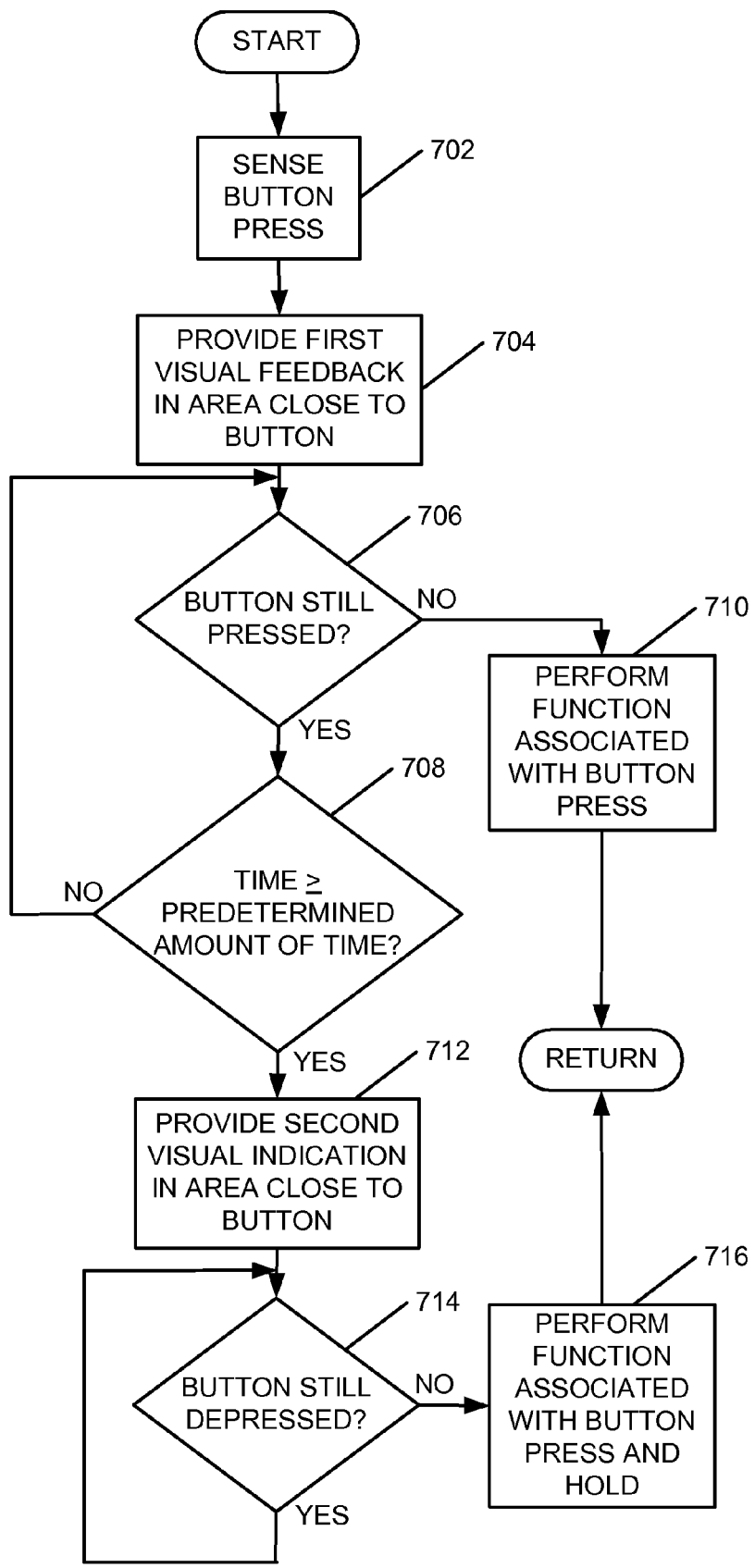
FIG. 7 is a flowchart describing exemplary processing which may be performed in an embodiment consistent with the subject matter of this disclosure.

FIG. 7 is a flowchart of an exemplary process which may be performed by a processing device in embodiments consistent with the subject matter of this disclosure. The process may begin with a processing device, such as, for example, processing device 100, sensing that a hardware button has been pressed, such as, for example, button 180 (FIG. 1) (act 702). The processing device may then provide a first feedback on a portion of a display screen located close to the pressed button (act 704). In some embodiments, the first feedback may be a first visual feedback. The first visual feedback may include, but not be limited to, text, an image, or an icon describing a first function associated with pressing of the button. In some embodiments, the first visual feedback may be highlighted. Further, in some embodiments in which the first visual feedback may be provided and highlighted during act 704, an un-highlighted second visual feedback may be provided. The second visual feedback may include, but not be limited to, text, an image, or an icon describing a second function associated with pressing and holding the button for at least a predetermined amount of time.

The processing device may then determine whether the button remains pressed (act 706). If the processing device determines that the button remains pressed, then the processing device may determine whether an amount of time that the button remains pressed is greater than or equal to a predetermined amount of time (act 708). In some embodiments, the predetermined amount of time may be one value for all buttons associated with functions. For example, the predetermined amount of time with respect to all buttons may be two seconds, or some other suitable value. In other embodiments, the predetermined amount of time may differ among some or all buttons associated with functions.

If the processing device determines that the button remains pressed, but a current amount of time of pressing and holding the button is not greater than or equal to the predetermined amount of time, then the processing device may again perform act 706 to determine whether the button remains pressed.

If, during act 706, the processing device determines that the button is no longer pressed, then the processing device may perform the first function associated with the button being pressed and held for a period of time less than the predetermined amount of time, and may clear the first visual feedback (and the second visual feedback may be cleared if displayed) (act 710).

If, during act 708, the processing device determines that the button is pressed and held for a period of time greater than or equal to the predetermined amount of time, then, in embodiments not yet showing the second visual feedback, the processing device may now present the second visual feedback, which may be highlighted (act 712). In embodiments showing both the first visual feedback and the second visual feedback, the second visual feedback, which may initially be shown as unhighlighted, may now be highlighted. The second visual feedback may be shown in a portion of a display located near the button. In some embodiments, the processing device may clear the first visual feedback in the display at this point. In other embodiments, the processing device may display the first visual feedback as unhighlighted while displaying the second visual feedback as highlighted.

The first processing device may then determine whether the button remains pressed (act 714). The first processing device may keep determining whether the button remains pressed and, when the processing device determines that the button is no longer pressed, the processing device may perform the second function and may clear the first visual feedback and the second visual feedback from the display (act 716).

Figure 8:
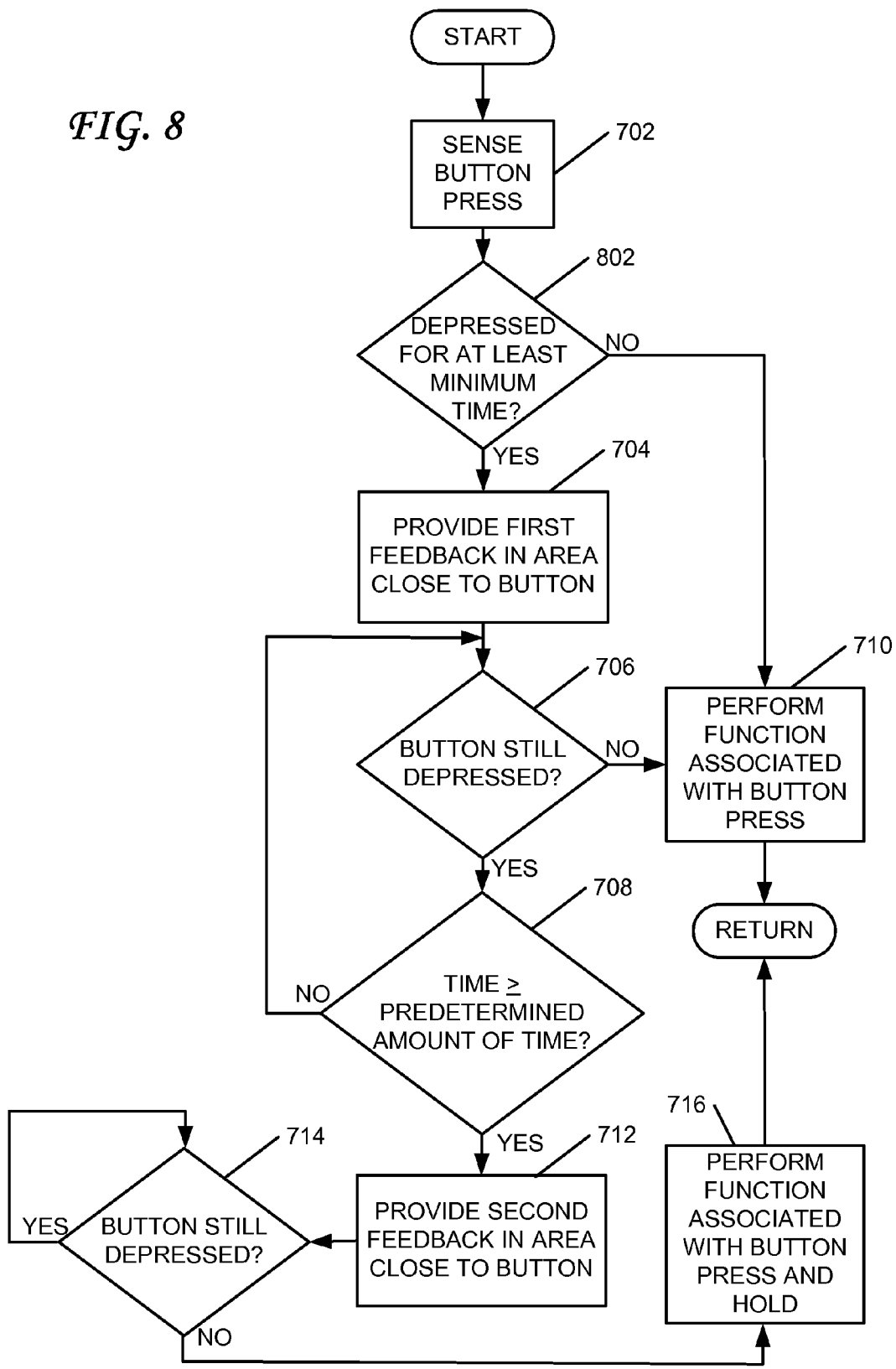
FIG. 8 is a flowchart describing exemplary processing which may be performed in a second embodiment consistent with the subject matter of this disclosure.

FIG. 8 is a flowchart illustrating a variation of the processing performed with respect to the flowchart of FIG. 7. The flowchart of FIG. 8 is identical to the flowchart of FIG. 7, except for an addition of act 802, after act 702 and before act 704. In this variation, after the processing device senses a button press, during act 702, the processing device may determine whether the button has been pressed for at least a minimum amount of time, such as, for example, 750 ms, or another suitable amount of time (act 802). If the button has not been pressed for at least the minimum amount of time, and is no longer pressed, then the processing device may perform act 710, as described previously with respect to FIG. 7. Otherwise, processing device may perform act 704, as described previously with respect to FIG. 7.

Thus, in embodiments which include a processing device that performs the process illustrated by the flowchart of FIG. 8, the processing device may perform a first function, associated with pressing a button, without displaying a visual feedback with respect to the pressed button, if the button is pressed for a period of time that is less than a predetermined minimum amount of time, such as, for example, 750 ms, or some other time period. If the button is pressed and held for a period of time longer than the predetermined minimum amount of time, but less than the predetermined amount of time associated with a second visual feedback, then a first visual feedback may be presented.

In variations of the above described embodiments, a processing device may provide visual feedback, with respect to pressing a button, for the first N times that a hardware button is pressed, where N may be 50, 75, or some other suitable value. After the first N times that a hardware button is pressed, the processing device may no longer provide the visual feedback unless the processing device is later configured to continue to provide visual feedback.

In other variations of the above described embodiments, a processing device may provide visual feedback, with respect to pressing a button, during a first initial time period. For example, the processing device may provide the visual feedback, with respect to pressing a button, for a first 90 days, or some other suitable time period, with respect to use of the processing device.

In some embodiments, a learning mode may be activated by selecting or entering a command via a command console or by another means of entering a command. While in the learning mode, the processing device may suppress performance of a respective first function and a respective second function associated with one or more hardware buttons, while displaying respective visual feedbacks to describe the respective first function and the respective second function when one of the one or more hardware buttons is pressed.

When the processing device is in certain states, some buttons may have no function. When such a button is pressed while the processing device is in one of the certain states, the first visual feedback and the second visual feedback may be displayed with a visual no-function indicator indicating that the button is currently non-functional. In one embodiment, the visual no-function indicator may be provided by displaying the first visual feedback or the second visual feedback in a different color or shade than a color or shade in which the first visual feedback or the second visual feedback are normally displayed. In an embodiment, when a button having no function is pressed, a first visual feedback and a second visual feedback may be displayed in a gray color. The same button being pressed when the button is associated with a function may cause visual feedback to be displayed in a color other than gray. In another embodiment, the visual no-function indicator may be provided by a line or an X overlayed onto a displayed first visual feedback or second visual feedback.

In some embodiments, when the processing device performs a function associated with a button, and the function is initiated by a method other than pressing of the button, the processing device may present a message or visual feedback indicating that the function may be performed by pressing a particular button, or pressing and holding the particular button.

Miscellaneous

Although the above exemplary embodiments describe the processing device as providing visual feedback in response to an action, such as, for example, a button press, other feedback may be provided in other implementations. For example, in some implementations, feedback may be provided in audio form, in addition to, or instead of, visual feedback. For example, in situations described above in which a first or a second visual feedback may be provided, in some implementations, a first or a second audio feedback may be provided instead of the first or the second visual feedback, or in addition to the first or the second visual feedback. In some embodiments, tactile feedback may be provided in addition to, or instead of, visual feedback. In some implementations, the tactile feedback may be further combined with audio feedback, or other feedback. Further, the above-described embodiments refer to a hardware button being pressed. In some embodiments, a button may be a soft button on a display screen. The soft button may be "pressed" or selected by touching a displayed image of the soft button using a pen, a stylus, a user's own finger, or other device on a touch screen display, which may have a digitizer. The soft button may be "released" by ceasing to touch the displayed image of the soft button.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A machine-implemented method for discovering at least one of a plurality of functions associated with a button of a processing device, the machine-implemented method comprising:

sensing a button press of the button of the processing device; and providing, in response to the sensing of the button press, a feedback describing the at least one of the plurality of functions associated with pressing of the button, the feedback including a first visual feedback, which describes a first function to be performed when the button is pressed and released, and a second visual feedback, which describes a second function to be performed when the button is pressed and held for a predetermined amount of time, the first visual feedback being initially highlighted;

determining that the button is pressed and held for the predetermined amount of time;

highlighting the second visual feedback and eliminating the first visual feedback after determining that the button is pressed and held for the predetermined amount of time; and ceasing to provide the first visual feedback and the second visual feedback, with respect to pressing the button, after the button is pressed a predetermined number of times, the ceasing of providing the first visual feedback and the second visual feedback when the button is pressed remaining in effect until the processing device is later configured to provide the first visual feedback and the second visual feedback.

2. The machine-implemented method of claim 1, wherein the feedback includes text describing the at least one of the plurality of functions.

3. The machine-implemented method of claim 1, wherein:
the first visual feedback and the second visual feedback are provided in an area of a display of the processing device close to a location of the button.

4. The machine-implemented method of claim 1, further comprising:
providing the first visual feedback in response to the sensing of the button press; and
providing the second visual feedback after the providing of the first visual feedback, only after the button is pressed and held for the predetermined amount of time.

5. The machine-implemented method of claim 1, wherein:
the first visual feedback and the second visual feedback are initially provided simultaneously.

6. The machine-implemented method of claim 5, further comprising:
providing a third visual feedback indicating a passing of time.

7. The machine-implemented method of claim 1, further comprising:
displaying a button map providing a feedback of functions associated with pressing individual ones of a plurality of buttons, for each of the plurality of buttons the feedback includes a description of a corresponding first function associated with pressing and releasing respective ones of the plurality of buttons and a corresponding second function associated with pressing and holding the respective ones of the plurality of buttons.

8. A processing device comprising:
at least one processor;
a memory;
a display;
a button arranged to send a signal to the at least one processor when the button is in a depressed position;
a bus connecting the at least one processor with the button, the display, and the memory, the memory including:
instructions for providing a first feedback of a first function associated with the button in response to sensing the button being in the depressed position,
instructions for providing a second feedback of a second function associated with the button in response to the at least one processor sensing the button being in the depressed position for at least a predetermined amount of time,
instructions for presenting a message, when a function is being performed and is initiated by an action other than depressing the button, indicating that the function, associated with the button, can be performed by depressing the button, and
instructions for ceasing to provide the first feedback and the second feedback, with respect to pressing the button, after the button is pressed a predetermined number times, the ceasing of providing the first feedback and the second feedback, with respect to pressing the button, remaining in effect until the processing device is later configured to provide the first feedback and the second feedback.

9. The processing device of claim 8, wherein:
the first feedback includes a first visual feedback, and
the memory further comprises:
instructions for performing the first function and clearing a display of the first visual feedback when the button is determined to be depressed for less than the predetermined amount of time.

10. The processing device of claim 8, wherein the memory further comprises:
instructions for displaying a button map providing first visual feedbacks of first functions associated with pressing individual ones of a plurality of buttons, for each of the plurality of buttons, and for providing second visual feedbacks of second functions associated with pressing and holding the individual ones of the plurality of buttons, for each of the plurality of buttons, each of the first visual feedbacks and each of the second visual feedbacks being displayed in a respective portion of the display located near a corresponding one of the plurality of buttons.

11. The processing device of claim 8, wherein the memory further comprises:
instructions for displaying a button map providing first visual feedbacks of first functions associated with pressing individual ones of a plurality of buttons, for each of the plurality of buttons, and for providing second visual feedbacks of second functions associated with pressing and holding the individual ones of the plurality of buttons, for each of the plurality of buttons, each of the first visual feedbacks and each of the second visual feedbacks being displayed in a respective portion of the display located near a corresponding one of the plurality of buttons, wherein:
ones of the first visual feedbacks and the second visual feedbacks with respect to nonfunctional ones of the plurality of buttons, during a current state of the processing device, are displayed with a visual no-function indicator.

12. The processing device of claim 8, wherein the memory further comprises
instructions for providing a third feedback indicating a passing of time while the button is sensed as being in the depressed position until the predetermined amount of time has passed.

13. A machine-readable medium for storing data having recorded thereon instructions for at least one processor, the instructions comprising:
instructions for providing a first feedback describing a first function associated with a button of a processing device in response to sensing the button being pressed;
instructions for providing a second feedback describing a second function associated with the button in response to the at least one processor sensing the button being pressed and held for at least a predetermined amount of time;
instructions for providing a third feedback while the button is in the depressed position, before the predetermined amount of time, to indicate an amount of time passing; and
instructions for ceasing to provide the first feedback and the second feedback, with respect to pressing the button, after an occurrence of one event from a group of events consisting of the button being pressed a predetermined number times and a passing of a predetermined time period, the ceasing of providing the first feedback and the second feedback, with respect to pressing the button, remaining in effect until the processing device is later configured to provide the first feedback and the second feedback.

14. The machine-readable medium of claim 13, wherein:
the first feedback includes a first visual feedback, and
the instructions further comprise:
   instructions for removing the first visual feedback from a display after the button is pressed and held for at least the predetermined amount of time.

15. The machine-readable medium of claim 13, wherein the instructions further comprise:
   instructions for displaying a button map providing an indication of a location of a plurality of buttons and a description of functions associated with depressing each of the plurality of buttons.

16. The machine-readable medium of claim 13, wherein the instructions further comprise:
   instructions for activating a learning mode for suppressing performance of the first function and the second function, after the button is pressed and released, while providing the first feedback or the second feedback in response to depressing the button.

17. The machine-readable medium of claim 13, wherein:
the first feedback includes a first visual feedback,
the instructions for providing the first feedback describing the first function associated with the button of the processing device in response to sensing the button being pressed further includes instructions for displaying the first visual feedback in a first color or a first shade when pressing the button causes the first function to be performed, and
the instructions for providing the first feedback describing the first function associated with the button of the processing device in response to sensing the button being pressed further includes instructions for displaying the first visual feedback in a second color or a second shade when pressing the button does not cause the first function to be performed.

18. The processing device of claim 8, wherein the memory further comprises:
   instructions for performing the first function and not providing the first feedback in response to sensing the button being in the depressed position for less than a minimum amount of time.

19. The machine-readable medium of claim 13, wherein the instructions further comprise:
   instructions for performing the first function and not providing the first feedback in response to sensing the button being in the depressed position for less than a minimum amount of time.

\* \* \* \* \*